United States Patent
Maeng (10) Patent No.: US 11,868,989 B1
(45) Date of Patent: Jan. 9, 2024

(54) MOBILE WALLETS AND COMPANION SMART CARDS

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 598 days.

(21) Appl. No.: 16/949,795

(22) Filed: Nov. 13, 2020

Related U.S. Application Data (62) Division of application No. 15/009,252, filed on Jan. 28, 2016, now abandoned.

(60) Provisional application No. 62/273,082, filed on Dec. 30, 2015.

(51) Int. Cl.
  *G06Q 20/36* (2012.01)
  *G06Q 20/32* (2012.01)
  *G06Q 20/34* (2012.01)

(52) U.S. Cl.
  CPC ......... *G06Q 20/36* (2013.01); *G06Q 20/3278* (2013.01); *G06Q 20/341* (2013.01); *G06Q 20/346* (2013.01); *G06Q 20/3674* (2013.01)

(58) Field of Classification Search
  CPC .. G06Q 20/36; G06Q 20/3278; G06Q 20/341; G06Q 20/346; G06Q 20/3674
  See application file for complete search history.

(56) References Cited

U.S. PATENT DOCUMENTS

| | | |
|---|---|---|
| 5,375,251 A | 12/1994 | Pfundstein |
| 5,748,737 A | 5/1998 | Daggar |
| 5,943,624 A | 8/1999 | Fox |
| 6,588,660 B1 | 7/2003 | Buescher et al. |
| 6,944,447 B2 | 9/2005 | Portman et al. |
| 7,360,692 B2 | 4/2008 | Zellner et al. |
| 7,438,236 B2 | 10/2008 | Top |
| 7,676,431 B2 | 3/2010 | O'Leary et al. |
| 7,702,587 B2 | 4/2010 | Nguyen et al. |

(Continued)

FOREIGN PATENT DOCUMENTS

| | | |
|---|---|---|
| EP | 2887272 A1 | 6/2015 |
| WO | WO-2007046785 A1 | 4/2007 |

(Continued)

OTHER PUBLICATIONS

"U.S. Appl. No. 15/009,252, Advisory Action dated Oct. 18, 2019".

(Continued)

*Primary Examiner* — Paul Danneman
(74) *Attorney, Agent, or Firm* — SCHWEGMAN LUNDBERG & WOESSNER, P.A.

(57) ABSTRACT

Methods and systems for augmenting smart card functionality using a companion mobile wallet are disclosed. The mobile wallet can establish communication with the companion smart card which can determine that the mobile wallet and the smart card are companions. The mobile wallet can send supplemental data to the companion smart card to augment the functionality of the smart card. The smart card can establish communication between with a POS device and send the supplemental data to the POS device. The mobile wallet, smart card and POS device can communicate with one another in an on-line mode or using batch processing.

20 Claims, 8 Drawing Sheets

(56) References Cited

U.S. PATENT DOCUMENTS

| | | | |
|---|---|---|---|
| 7,841,528 | B2 | 11/2010 | Savry et al. |
| 7,967,196 | B1 | 6/2011 | Bierbaum et al. |
| 8,019,365 | B2 | 9/2011 | Fisher |
| 8,108,261 | B2 | 1/2012 | Carlier et al. |
| 8,186,602 | B2 | 5/2012 | Itay et al. |
| 8,285,643 | B2 | 10/2012 | Isaacson et al. |
| 8,352,323 | B2 | 1/2013 | Fisher |
| 8,429,047 | B2 | 4/2013 | Hurst |
| 8,438,073 | B2 | 5/2013 | White |
| 8,463,674 | B2 | 6/2013 | Hurst |
| 8,511,543 | B2 | 8/2013 | Yankovich |
| 8,561,894 | B1 | 10/2013 | Mullen et al. |
| 8,589,237 | B2 | 11/2013 | Fisher |
| 8,768,834 | B2 | 7/2014 | Zacarias et al. |
| 8,788,333 | B2 | 7/2014 | Alba et al. |
| 8,788,418 | B2 | 7/2014 | Spodak et al. |
| 8,831,637 | B2 | 9/2014 | Stopel et al. |
| 8,977,569 | B2 | 3/2015 | Rao |
| 9,015,066 | B2 | 4/2015 | Scipioni et al. |
| 9,224,141 | B1 * | 12/2015 | Lamba ................. G06Q 20/341 |
| 2002/0054513 | A1 | 5/2002 | Kao |
| 2002/0077993 | A1 | 6/2002 | Immonen et al. |
| 2002/0179704 | A1 | 12/2002 | Deaton |
| 2004/0127256 | A1 | 7/2004 | Goldthwaite et al. |
| 2005/0076369 | A1 | 4/2005 | Cai et al. |
| 2007/0265984 | A1 | 11/2007 | Santhana |
| 2007/0284871 | A1 | 12/2007 | Gray |
| 2008/0051059 | A1 | 2/2008 | Fisher |
| 2009/0064301 | A1 | 3/2009 | Sachdeva et al. |
| 2009/0143104 | A1 | 6/2009 | Loh et al. |
| 2009/0271253 | A1 | 10/2009 | Arazy et al. |
| 2009/0288012 | A1 | 11/2009 | Hertel et al. |
| 2010/0057580 | A1 | 3/2010 | Raghunathan |
| 2010/0125510 | A1 | 5/2010 | Smith et al. |
| 2010/0223110 | A1 | 9/2010 | Slavin et al. |
| 2010/0318415 | A1 | 12/2010 | Gottlieb |
| 2011/0295705 | A1 | 12/2011 | Kasmei |
| 2011/0295744 | A1 | 12/2011 | Wisniewski et al. |
| 2012/0023024 | A1 | 1/2012 | Evans |
| 2012/0089425 | A1 | 4/2012 | Borucki |
| 2012/0143752 | A1 | 6/2012 | Wong et al. |
| 2012/0166333 | A1 | 6/2012 | Von Behren et al. |
| 2013/0013499 | A1 | 1/2013 | Kalgi |
| 2013/0024372 | A1 * | 1/2013 | Spodak ............ G06K 19/06187 705/41 |
| 2013/0097041 | A1 | 4/2013 | Fisher |
| 2013/0103478 | A1 | 4/2013 | Fisher |
| 2013/0103511 | A1 | 4/2013 | Fisher |
| 2013/0103512 | A1 | 4/2013 | Fisher |
| 2013/0103513 | A1 | 4/2013 | Fisher |
| 2013/0103514 | A1 | 4/2013 | Fisher |
| 2013/0151360 | A1 | 6/2013 | Scipioni et al. |
| 2013/0191279 | A1 | 7/2013 | Calman et al. |
| 2013/0204785 | A1 | 8/2013 | Monk |
| 2013/0304561 | A1 | 11/2013 | Warner et al. |
| 2013/0311363 | A1 | 11/2013 | Ramaci |
| 2013/0332337 | A1 | 12/2013 | Tran |
| 2014/0089120 | A1 | 3/2014 | Desai et al. |
| 2014/0129435 | A1 | 5/2014 | Pardo et al. |
| 2014/0129438 | A1 | 5/2014 | Desai et al. |
| 2014/0172700 | A1 | 6/2014 | Teuwen et al. |
| 2014/0195425 | A1 | 7/2014 | Campos et al. |
| 2014/0279106 | A1 | 9/2014 | Smelcer |
| 2014/0279403 | A1 | 9/2014 | Baird et al. |
| 2014/0291392 | A1 | 10/2014 | Teuwen et al. |
| 2014/0291406 | A1 | 10/2014 | Ko |
| 2015/0045068 | A1 | 2/2015 | Soffer |
| 2015/0235256 | A1 | 8/2015 | Barsoum et al. |

FOREIGN PATENT DOCUMENTS

| | | |
|---|---|---|
| WO | WO-2011072969 A1 | 6/2011 |
| WO | WO-2012083113 A3 | 6/2012 |
| WO | WO-2014084484 A1 | 6/2014 |
| WO | WO-2014122453 A2 | 8/2014 |

OTHER PUBLICATIONS

"U.S. Appl. No. 15/009,252, Advisory Action dated Oct. 22, 2020".

"U.S. Appl. No. 15/009,252, Final Office Action dated Jul. 29, 2019".

"U.S. Appl. No. 15/009,252, Final Office Action dated Aug. 13, 2020".

"U.S. Appl. No. 15/009,252, Non Final Office Action dated Mar. 6, 2020".

"U.S. Appl. No. 15/009,252, Non Final Office Action dated Dec. 14, 2018", 11 pgs.

"U.S. Appl. No. 15/009,252, Response filed May 14, 2019 to Non Final Office Action dated Dec. 14, 2018", 10 pgs.

"U.S. Appl. No. 15/009,252, Response filed Jun. 8, 2020 to Non Final Office Action dated Mar. 6, 2020", 9 pgs.

"U.S. Appl. No. 15/009,252, Response filed Sep. 30, 2019 to Final Office Action dated Jul. 29, 2019", 11 pgs.

"U.S. Appl. No. 15/009,252, Response filed Oct. 10, 2018 to Restriction Requirement dated Aug. 10, 2018", 5 pgs.

"U.S. Appl. No. 15/009,252, Response filed Oct. 13, 2020 to Final Office Action dated Aug. 13, 2020", 9 pgs.

"U.S. Appl. No. 15/009,252, Response filed Oct. 29, 2019 to Advisory Action dated Oct. 18, 2019", 11 pgs.

"U.S. Appl. No. 15/009,252, Restriction Requirement dated Aug. 10, 2018", 7 pgs.

"Card1 Debuts Universal Card Technology Connecting Conventional Payment Card to Digital Wallet Platform", BusinessWire, (Sep. 21, 2015), 2 pgs.

"Contactless Mobile Payment Application Activation User Interface Overview, Usage Guidelines, and PPSE Requirements,", EMVCo, Version 1.0, (Dec. 2010), 120 pgs.

"Wallet-POS Specification", GSM Association, Version 1.0, (May 2013), 32 pgs.

Balan, Rajesh, et al., "The Digital Wallet: Opportunities and Prototypes", Invisible Computing IEEE Computer Society, (2009), 100-102.

Kadambi, Kiran S., et al., "Near-Field Communication-Based Secure Mobile Payment Service", Proceedings of the 11th international Conference on Electronic Commerce, ACM, (2009), 142-151.

Pourghomi, Pardis, et al., "A Secure Cloud-Based Nfc Mobile Payment Protocol", vol. 15, (Nov. 2014), 8 pgs.

U.S. Appl. No. 15/009,252, filed Jan. 28, 2016, Mobile Wallets and Companion Smart Cards.

* cited by examiner

MOBILE WALLETS AND COMPANION SMART CARDS

CROSS-REFERENCES TO RELATED APPLICATION

This patent application is a divisional of U.S. patent Ser. No. 15/009,252, filed Jan. 28, 2016, which claims the benefit of U.S. Provisional Patent Application No. 62/273,082, filed Dec. 30, 2015, entitled "MOBILE \VAT LETS AND COMPANION SMART CARDS", each of which are incorporated by reference herein in their entirety.

TECHNICAL FIELD

Embodiments described herein generally relate to mobile wallets and smart cards including, for example and without limitation, programming and augmenting smart card functionality using mobile wallets.

BACKGROUND

Smart cards and mobile wallets allow consumers convenient options for making purchases at point of sale (POS) devices. Smart cards include a variety of programmable devices capable of contact and/or contactless connection with POS devices. Mobile wallets can operate on mobile devices such as phones and watches and often connect with POS devices in a contactless manner using near field communication (NFC) for example. Some POS devices do not accept both mobile wallets and smart cards, but only one as a form of payment.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Systems and methods disclosed herein allow mobile wallets to program and provide additional data to smart cards to augment the function of smart cards. The additional data can be provided from a mobile wallet to a companion smart card while the smart card is coupled with a POS device or in an off-line or batch mode. A companion smart card is one that is associated with a mobile wallet or wallet element. The additional data that can be provided by the mobile wallet to the smart card can include a variety of information including coupons, identification information (e.g., driver's license data) and time and location data (e.g.; GPS data). This can, for example, allow a user of a smart card to provide additional data from his or her mobile wallet to a POS device that does not accept mobile wallets.

Figure 1:
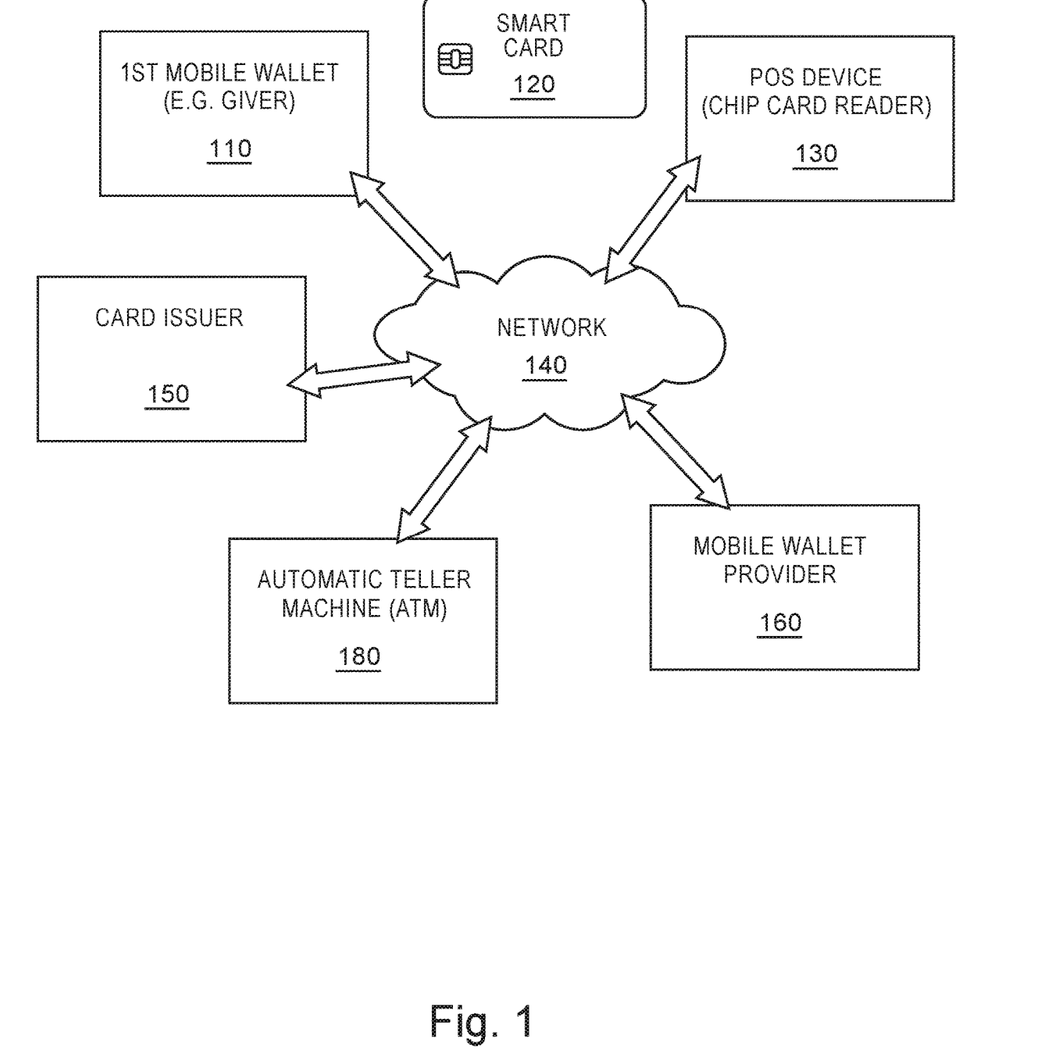
FIG. 1. illustrates a mobile wallet environment, according to various examples.

FIG. 1 illustrates an environment 100 for using a mobile wallet and a companion smart card, according to an example. The environment 100 includes a mobile wallet 110, a companion smart card 120, a point-of-sale (POS) device 130, a card issuer 150, a mobile wallet provider 160, an automatic teller machine (ATM) 180, and a network 140. A mobile wallet application (sometimes, simply referred to as a mobile wallet) can, for example, be a digital or electronic wallet application operating on a personal computing device such as a personal computer, laptop computer, smart phone, smart watch or tablet or can be an application operating on an external system (e.g., wallet service provider 160) accessible by a personal computing device over a network. Example mobile wallet applications include those provided by Apple Pay, Visa Pay, Google Wallet, Samsung Pay, and Starbucks Mobile App.

A mobile wallet can include a number of different wallet elements or items including credit cards, debit cards, reward cards, identification cards, tickets, boarding passes, etc. For each wallet item, the mobile wallet stores unique account information. For a credit card, for example, the unique account information can be a unique token and cryptograph typically provided by the card network and/or card-issuing bank. In another example, the unique account information for a credit card can be the credit card number and the account holder's name. The card issuer 150 can be a financial institution such as a bank or other type of organizations issuing credit or debit cards.

The companion smart card 120 can, for example, be a contact, contactless, or dual interface (contact and contactless) programmable device capable of connecting with POS devices or ATMs by physical contact and/or in a contactless manner using near field communications (NFC) for example. The smart card 120 can, for example, include an integrated circuit and memory (e.g., an embedded chip or microcontroller). The smart card 120 can conform to one or more international standards (e.g., ISO/IEC 7816 and ISO/IEC 14443) and can be a plastic card similar in size to a credit card or can take a variety of other forms. Contact smart cards can be powered by the POS device. Contactless smart cards can be self-powered or can use electromagnetic fields from the reader of the POS device to power the chip. Dual-interface cards can be self-powered and powered from the reader of the POS device.

The smart card 120 and mobile wallet 110 can be issued by the same card issuer 150. The companion smart card can be a payment card like credit or debit card or a non-payment card like insurance card or an identification card such as a driver's license or other ID. In one scenario, the card issuer 150 is a financial institution (e.g., credit card company or bank) and issues both the mobile wallet 110 and the companion smart card 120 to a customer. The mobile wallet 110 and companion smart card 120 can share the same account at the financial institution and unique identification information can be stored on the mobile wallet 110 and companion card 120 to enable the devices to connect.

Companion smart cards for mobile wallets can provide benefits, especially at merchants that do not accept mobile wallets. For example, with a companion mobile wallet, a smart card holder can electronically submit discount coupons and identification when making a payment, rather than presenting these items physically. As another example, a companion smart card holder can provide authentication from his or her mobile device on which the companion mobile wallet operates as part of the transaction authorization process. This can avoid calls with card issuers that flag usages that are out of pattern.

The POS device 130 can, for example, be include a contact or contactless card reader capable of communicating with the smart card 120 and/or the mobile wallet 110. POS devices can, for example, be located at merchants or financial institutions. To make a payment with a mobile wallet at a POS device, for example, a user can select a wallet item (e.g., credit card item, smart card converted to a wallet element) for the transaction and place the mobile device near the POS card reader. The mobile device can then wirelessly transfer the unique account information (e.g., device account number) for the wallet element to the POS card reader using near field communication (NFC) or magnetic secure transmission (MST), for example. With a smart card, a user can contact or place the smart card near the POS device and the smart card can transfer unique account information to the POS reader. The POS card reader can then, for example, send a merchant identification number, the unique account information and the transaction amount to a processing network (e.g., card network and issuing banks) to authorize payment.

The environment 100 can further include the mobile wallet provider 160. The wallet service provider 160 can, for example, be a computing system capable of interfacing (e.g., using an Application Programming Interface) with mobile wallets to set up and manage mobile wallets and enable mobile wallets to include elements from various providers (e.g., card issuers). The wallet service provider can be part of a card issuer system 150 or bank network or can be separate from those systems.

The network 140 can include one or more networks over which the various systems communicate using network interfaces. The network 140 can include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 140 can include a single local area network (LAN) or wide-area network (WAN), or combinations of LAN's or WAN's, such as the Internet.

The illustrated environment 100 is provided by way of example and other types of mobile wallet architectures can be used with the systems described herein. For example, the mobile wallet application can operate on other types of computing devices such as desktop computers, laptop computers, and tablets. The use of a smart phone is illustrated in the following examples, but the systems and methods described herein are not so limited. Moreover, a mobile wallet can be an application associated with a single card or can be an application associated with multiple cards, one of which is a companion to a smart card.

Figure 2:
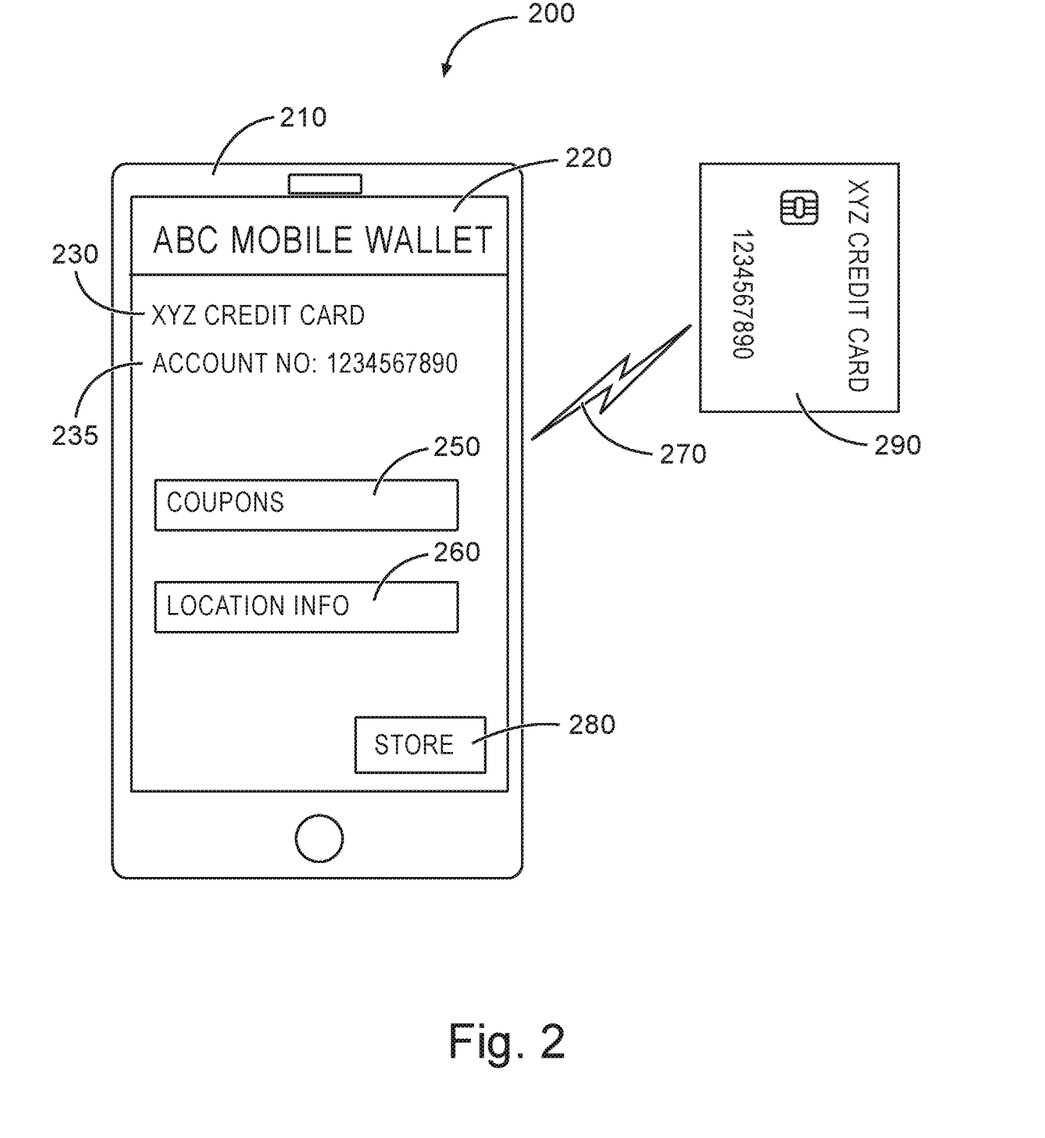
FIG. 2 illustrates a mobile wallet environment, according to various examples.

FIG. 2 illustrates an embodiment of a mobile wallet 220 programming a companion smart card 290. The mobile wallet 220 can operate on a computing device such as a smart phone 210. The mobile wallet 220 can include a credit card element 230. The credit card element 230 and the companion smart card can be issued by the same card issuer (e.g., a financial institution). In the illustration, both the credit card element 230 and companion smart card 290 share the same account number 235.

The companion smart card 290 can be a contactless or dual-interface smart card. The customer can use the mobile wallet 220 to read and view the content of smart card 290 and to write data to the smart card 290, For instance, the customer can use the mobile wallet 220 to find discount coupons 250 in the mobile wallet 220 for the products to purchase and touch the store button 280 to store them in the smart card 290 wirelessly over a wireless communication path 270.

The communication path 270 can, for example, use near filed communication (NFC) (e.g., ISO/IEC 14443) or other technology standards such as Bluetooth or Wi-Fi. The mobile wallet 220 can provide other information to the smart card 290 such as GPS location information 260 obtained from the GPS device in the mobile device 210. In other embodiments, the mobile wallet 220 can use an external chip card reader/writer (not shown) to read and program the smart card 290.

The companion smart card 290 and/or mobile wallet 220 can determine whether the two are companions prior to allowing the mobile wallet 220 to read data from or write data to the smart card. For example, the smart card 290 can store a unique device identification (ID) for the mobile wallet, card element or smart phone. The ID can be stored on the smart card by the card issuer during production. Similarly, the mobile wallet 220 may hold the unique companion smart card ID in it. For example, when a card issuer issues the mobile wallet element 130 and the companion smart card 290, it can store a unique identification (ID) in the mobile wallet element 230 and the smart card 290 respectively. When the companion smart card 290 communicates with the mobile wallet 220, the smart card can obtain the mobile wallet's ID and check whether it matches the ID stored on the smart card. With a match, the mobile wallet can access and change data on the smart card. If the ID does not match with the companion mobile wallet ID stored in its memory, the smart card can block access to its data.

Figure 3:
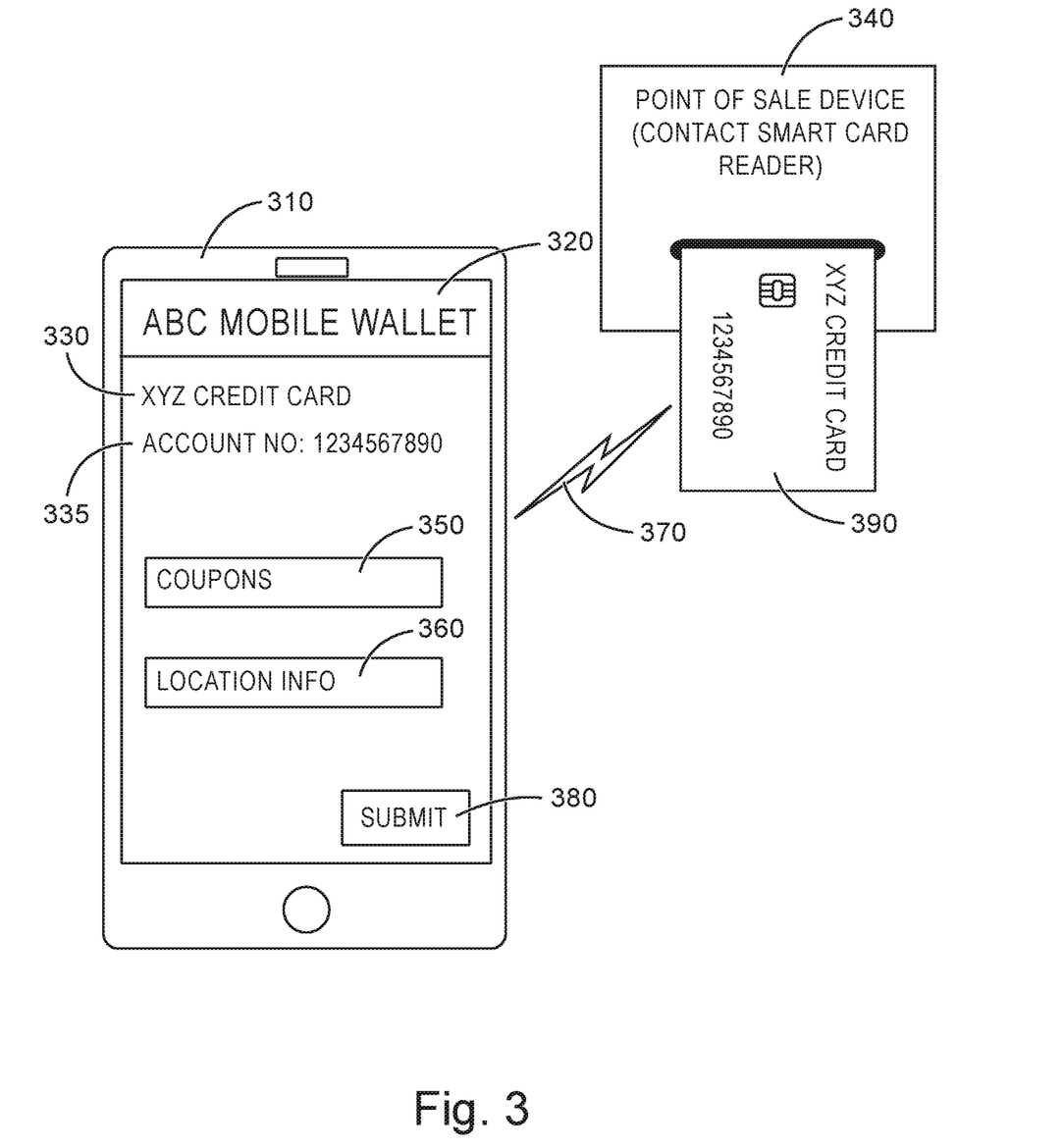
FIG. 3 illustrates a mobile wallet environment, according to various examples.

FIG. 3 illustrates a companion smart card 390 with a mobile wallet 320 in an online mode with a POS device 340, according to one example. The companion smart card 390 and mobile wallet element 330 can be issued the same credit card company 330, for example. In this example, the smart card 390 can be a dual-interface card having contact and contactless processing capability and the POS device 340 can be a contact-only device (e.g., one that does not accept mobile wallets or use NFC). In an example, the POS device 340 may be contactless but not support the contactless protocols of the mobile wallet 320. In use, the customer can insert the dual-interface smart card 390 into the POS device 340, and, while the dual-interface card 390 is in the card reader 340, the mobile wallet 320 can communicate with the dual-interface card 390 via a wireless communication path 370. The communication path 370 can, for example, use near filed communication (NFC) (e.g., ISO/IEC 14443) or other technology standards such as Bluetooth or Wi-Fi.

The dual-interface smart card 390 can recognize the companion mobile wallet element 330 with its unique ID provided from the mobile wallet 320 when establishing communication with it. In other examples, the mobile device 310 can provide a unique identifier of the mobile device 310 or mobile wallet 320 to authenticate that the wallet element 330 and smart card 390 are companions. The mobile wallet 320 can submit additional content for the dual-interface card 190 when it is connected to the POS device 340. For instance, while the dual-interface card 390 is in the POS device 340, the mobile wallet 320 can retrieve coupons 350, location information 360, and/or unique phone identification (not shown) in the mobile wallet and submit them to the POS device 340 through the dual-interface card 390 over the wireless path 370. The smart card 390 can in turn send this information to the POS device 340 for further processing.

The mobile wallet augments the functionality of the dual-interface card 390 thereby giving it more functionality than conventional smart cards. For instance, consider the case where the dual-interface card 390 has insufficient memory to store coupons or other data that is stored on the smart phone 310 or otherwise accessible by the mobile wallet 320. When the customer submits a payment to the contact POS device 340, the mobile wallet 320 can retrieve and submit coupons 350 (or other data) to the POS device 340 via the dual-interface card 190. In other embodiments, the mobile wallet 320 can retrieve data such as coupons 350 or location information 360 and transmit the data to the dual-interface card 390 before inserting the card 390 in the POS device 340, The dual-interface card 390 can store the data in its memory and can submit the data to the POS device 340 when the dual-interface card 390 is later inserted in the POS device 340.

Figure 4:
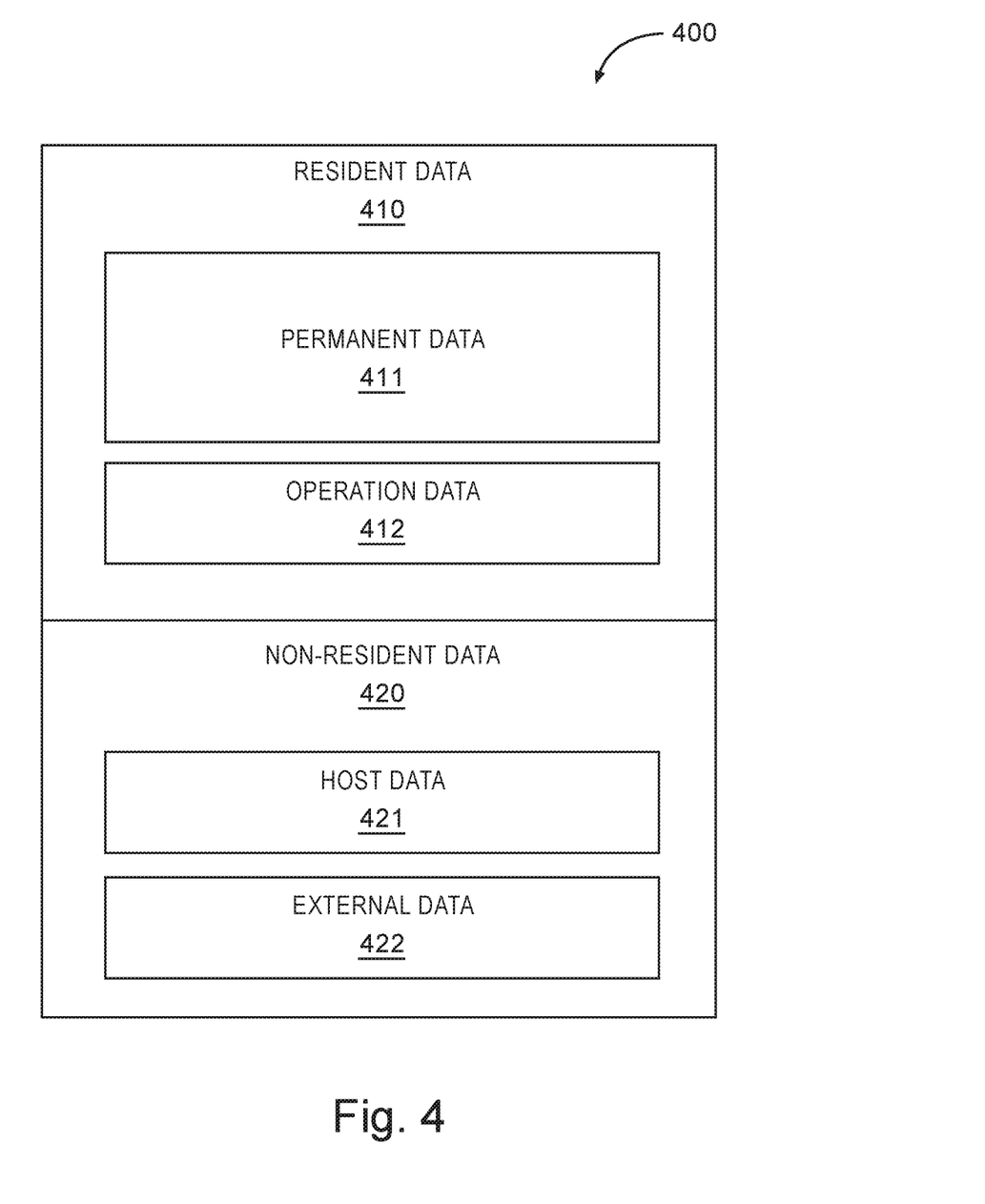
FIG. 4 is a block diagram of a memory configuration for a smart card, according to various examples.

FIG. 4 illustrates a memory configuration 400 for a companion smart card, according to one example. The memory 400 can include resident data 410 (e.g., provide by the card issuer when the smart card is issued) and non-resident data 420 (e.g., provided by a companion mobile wallet). The resident data 410 can, for example, include permanent data 411 and operation data 422. The permanent data 411 can, for example, include data used to identify the smart card, the name of the card account holder, and other information used to process payments if the card is a credit card or debit card. The operation data 412 can, for example, include data used to assist operation of the smart card such as security related data, transaction specific data, and a unique identifier associated with a companion mobile wallet. The card issuer can change the operation data 412. The operation data 412 can, for example, hold a secret code that helps with security. For example, periodically or each time the customer uses the smart card, the card issuer can read a secret transaction code stored on the card to verify the card use and can write a new transaction code for the next use to prevent fraudulent use of a stolen or lost card.

The non-resident data 420 can include data provided by a companion mobile wallet (e.g., when a communication path is established between the mobile wallet and the companion smart card.) The non-resident data 420 can, for example, include host data 421 from a companion device (e.g., GPS data from a smart phone) and external data 422 from other sources such as merchants, mobile wallet service providers, and card issuers (e.g., discount coupons). The non-resident data 420 can, for example, be modified by a companion mobile wallet to provide additional services or manage the mode of operation of the card. For instance, host data can include time, date and calendar data, GPS data and photos from a host device on which a companion mobile wallet operates. In one example, the host data 421 can include a timer value set by the host device, and a microcontroller in the smart card can use it to enable or disable the card for certain period of time.

The resident data 410 can, for example, include data sufficient to perform a basic transaction with the smart card. For example, a smart credit card without non-resident data 420 can provide transaction authorization data to enable a purchase using resident data 410. The non-resident data 420 allows the function of the smart cart to be augmented by a companion mobile wallet and perform more functions than a basic transaction. In use, for example, when a customer submits a smart credit card with non-resident data to a contact or contactless POS device, the companion smart card can submit both resident data 410 and non-resident 520 data in order to perform the transaction and provide additional services such as submitting coupons stored as external data 422, presenting additional authentication data (e.g., GPS location information or fingerprint identification data) stored as host data 421.

Figure 5:
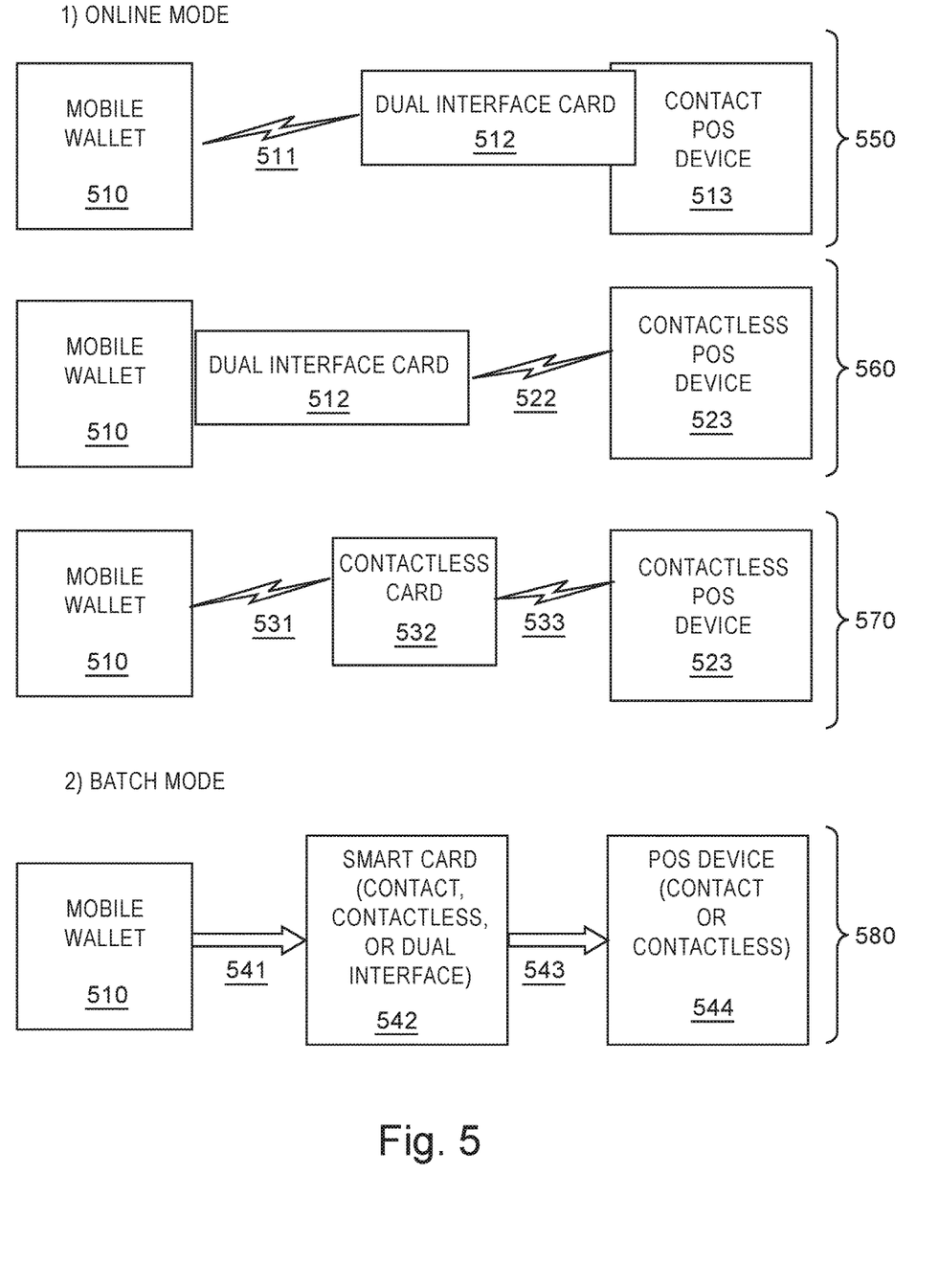
FIG. 5 illustrates communication schemes between mobile wallets, smart cards and POS devices, according to various examples.

FIG. 5 illustrates modes of augmenting a companion smart card with data from a mobile wallet, according to various examples. The modes can include an online mode (triodes 550, 560, and 570) and a batch mode (mode 580), for example. In the online modes, a mobile wallet can provide additional data to a POS device via a companion smart card while the smart card is connected to the POS device.

Mode 550 illustrates an example of online augmentation using a dual interface card 512. In this example, a mobile wallet 510 wirelessly sends data (e.g., non-resident data) to augment the dual interface card 512 functionality while the card 512 is in physical contact with a contact POS device 513.

Mode 560 illustrates an example of online augmentation using the dual interface card 512 physically coupled to a mobile wallet 510 (e.g., via a card reader connected to a mobile device on which the mobile wallet 510 operates) and wirelessly communicating with a contactless POS device 523 using a wireless communication path 522 (e.g., NFC).

Mode 570 illustrates an example of online augmentation using a contactless card 532 that is in wireless communication with both a mobile wallet 510 and contactless device 523 over communication paths 531 and 533 respectively. The communication paths 531 and 533 can use different methods (e.g., one can use NFC and the other Bluetooth) or can use the same method (e.g., both can use NFC). In the latter case, when the same path is used, the mobile wallet 510, contactless smart card 532 and POS device 523 can use techniques to avoid collision in communication signals.

Mode 580 illustrates a batch or off-line mode for augmenting smart card 542 functionality with a companion mobile wallet 510. The smart card 542 can be a contact card, contactless card or dual interface card. In this mode, the mobile wallet 510 provides the companion smart card 542 with data over a communication path 541 while the smart card is off-line (e.g., not connected to a POS device). When later used at POS device 544 over a communication path 543, the smart card 542 sends data from the mobile wallet 510 (e.g., host data and/or external data) to the POS device 544 which in turn uses the data for subsequent processing. Communication paths 541 and 543 can be contact or contactless channels depending on the type of smart card.

Figure 6:
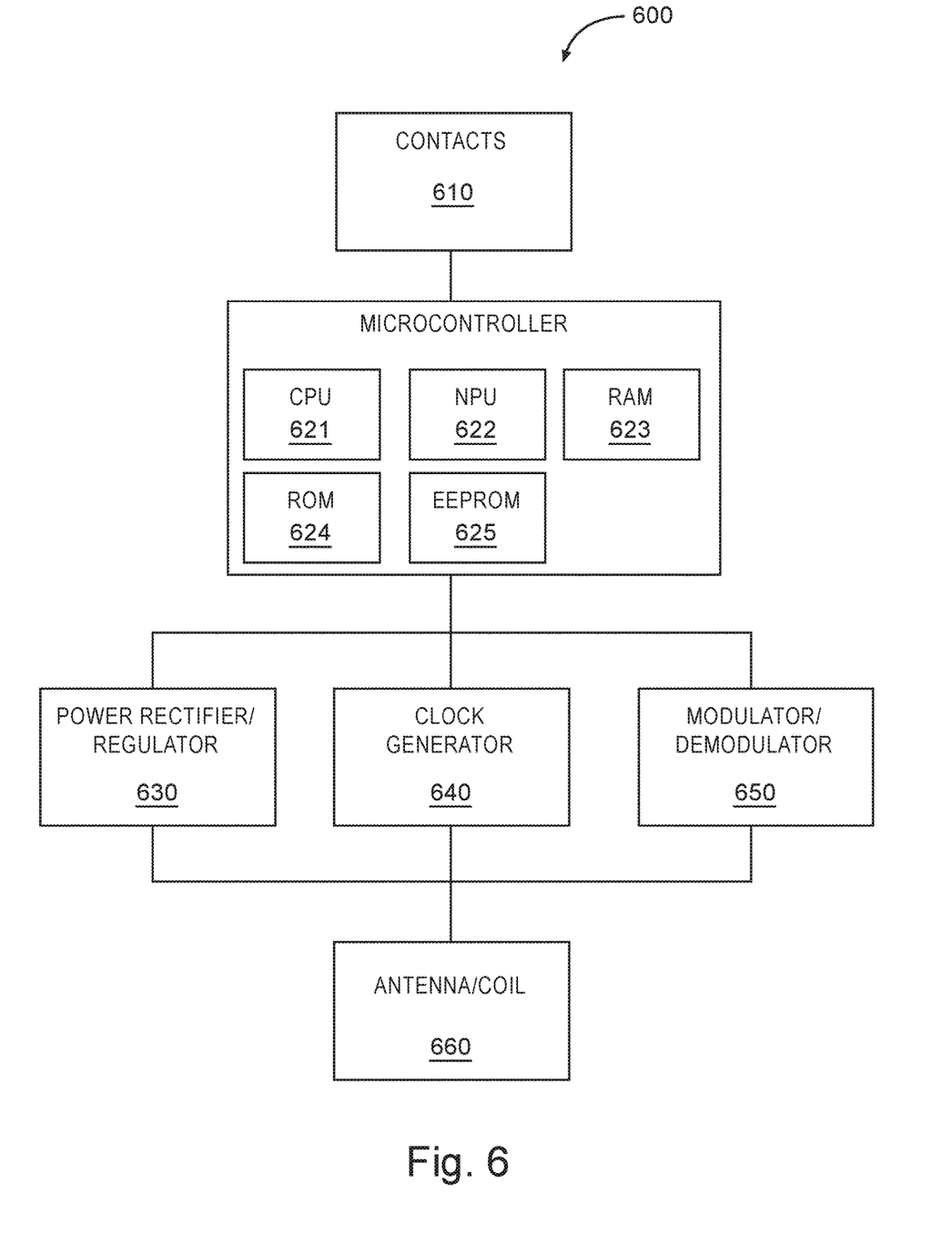
FIG. 6 is a block diagram of a dual-interface smart card, according to various examples.

FIG. 6 illustrates a block diagram of a dual-interface smart card 600, according to an example. The dual-interface card 600 includes contacts 610 for making physical contact with a card reader, a microcontroller 620, a power rectifier/regulator 630, a clock generator 640, a modulator/demodulator 650, and antenna/coil 660. The contacts 610 can, for example, be physical contacts that provide electrical connection with a contact card reader and can be compliant to the ISO standard 7816. The microcontroller 620 can, for example, include a central processing unit (CPU) 621, numerical processing unit 622, random access memory 623, read only memory 624, and electrically erasable programmable read only memory (EEPROM) 625. The microcontroller 620 can, for example, receive RF signals from a mobile device of a companion mobile wallet and convert the RF signals to data and pass the data to a contact reader. The numerical coprocessor (NPU) 622 can, for example, execute security operations. The clock generator 640 can generate a clocking signal to operate the electronic circuits and the modulator/demodulator 650 can demodulate RF signals to data from the antenna 660 and modulate data to RF signals. The memory blocks 623, 624, and 625 can store resident data and non-resident data.

The power rectifier/regulator 630 can, for example, convert an electromagnetic field obtained by the antenna/coil 660 to power for the card 600 when it is used as contactless card. When the dual-interface card 600 is physically coupled to a contact reader using contacts 610, the card 600 can obtain power from the card reader via the contact 610. When used in a dual mode the card 600 can obtain power from either or both sources. For example, when a companion mobile wallet transmits additional data (e.g., host or external data) to a POS device through a dual-interface card that is in physical contact with a POS device in an online mode, the dual-interface card 600 can obtain power from the contact reader and/or the power rectifier/regulator 630 in the card 600.

Figure 7:
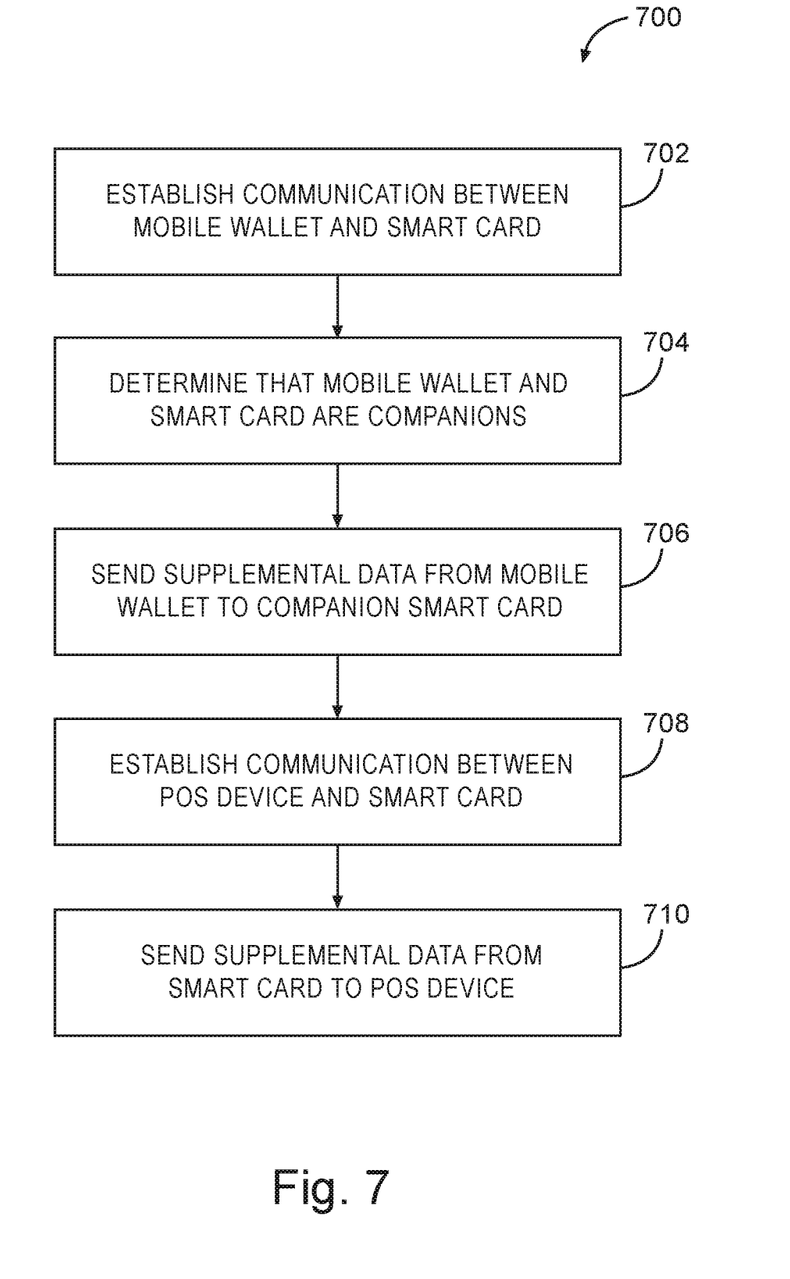
FIG. 7 is a flowchart of a method of using a mobile wallet to augment the function of a companion smart card, according to various examples.

FIG. 7 illustrates a method 700 for using a mobile wallet and a companion smart card, according to an example. The mobile wallet can, for example, operate on a mobile device such as phone, watch or tablet or can operate on a server which can be accessed over a network by a mobile device.

The companion smart card can, for example, be a programmable smart card associated with a mobile wallet element. The mobile wallet via the mobile device can, for example, establish connection with the programmable chip of the smart card using NFC in order to read and write information to the chip.

At 702, communication is established between the mobile wallet and the smart card. For example, the mobile wallet can establish a wireless communication path with the smart card using NEC or can establish a physical communication path using a card reader. At 704, the smart card determines that the mobile wallet and the smart card are companions. This can include, for example, sending identification data from the mobile wallet to the smart card and determining that the identification data matches identification information of the smart card. The identification data can, for example, include a unique identifier of a mobile wallet element, of the mobile device or of the mobile wallet.

At 706, the mobile wallet sends supplemental data from the mobile wallet to the companion smart card. In one example, the supplemental data is sent while communication between the smart card and POS device is not established. For example, a user can store coupons or other supplemental data on the smart card off-line for later use at a POS device. In another example, the supplemental data is sent while the communication between the smart card and POS device is established. At 708, communication is established between the smart card and a POS device. The type of communication can vary with the type of smart card and can be over a contact channel or contactless channel. At 710, the smart card sends the supplemental data to the POS device. The smart card can also send transaction authorization data (e.g., card number, token or device account number) to the POS device for approval and processing of a transaction.

The method 700 can further include the mobile wallet sending time and/or location data for the mobile wallet (e.g., GPS data from a host mobile device) and the smart card sending the time and location data from the mobile wallet to the POS device. This can, for example, be done in response to receiving a request for time and location data from a processing network for security purposes, for instance.

In one example, where the smart card is a dual interface card, the method 700 can include the smart card and POS device communicating over a first path while at the same time the smart card and the mobile wallet communicating over a second, different path. For example, one of the paths can be a wireless path (e.g., using NFC) and the other being a physical connection.

In one example, where the smart card is a contactless card, the method 700 can include the smart card and POS device communicating over a first wireless path while at the same time the smart card and mobile wallet communicate over a second wireless path. Both paths can use the same method (e.g. NFC) or can use different wireless methods (e.g., NFC and Bluetooth).

The method 700 can further include enabling and disabling a smart card using a companion mobile wallet. For example, a companion mobile wallet can send a time period (e.g., five minutes) of usage to the smart card during programming. When presented for a transaction, the smart card can check the current time against the time period established by the companion mobile wallet to determine if the transaction can be processed.

Figure 8:
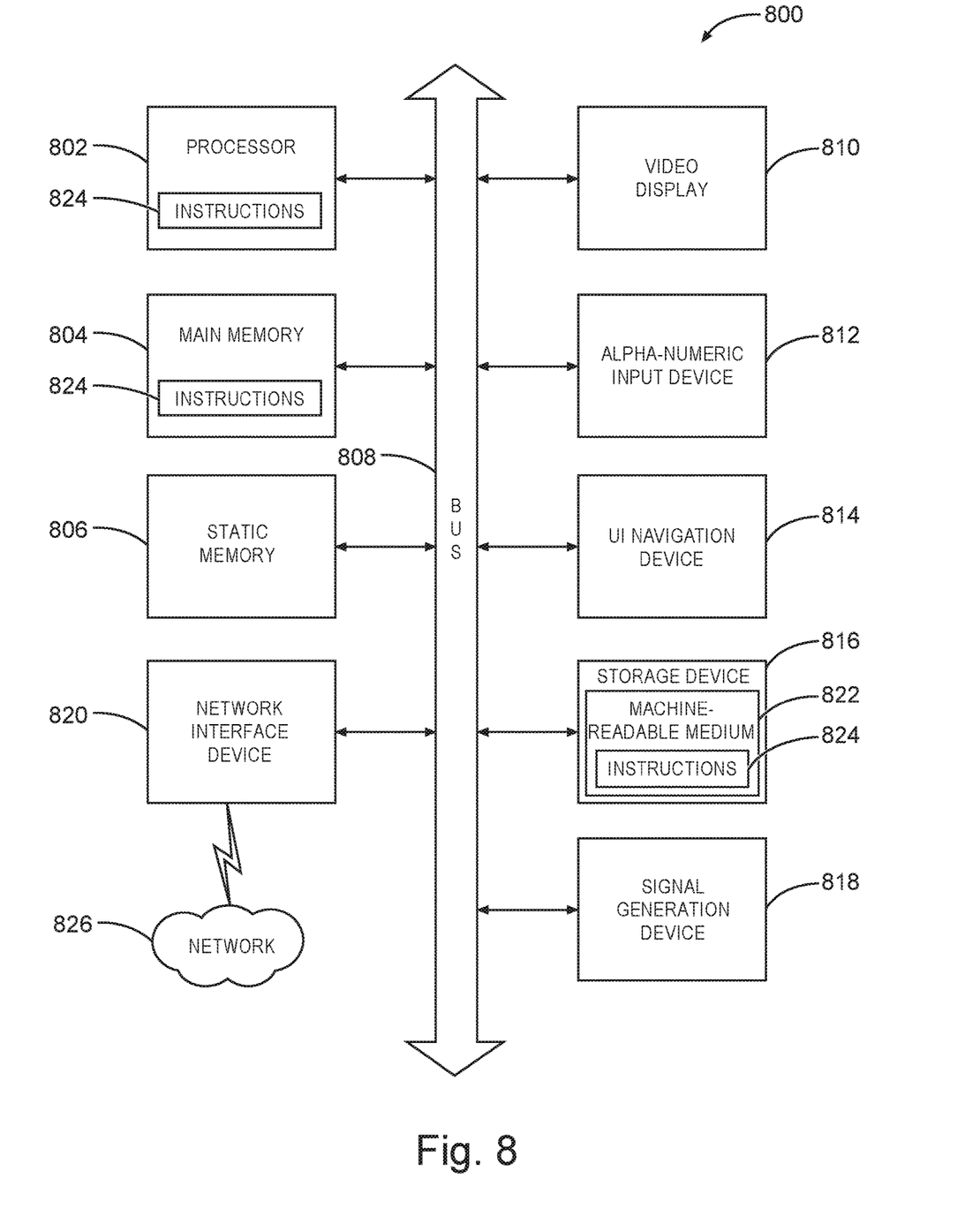
FIG. 8 is a block diagram of a machine in the example form of a computer system within which a set of instructions, for causing the machine to perform any one or more of the methodologies discussed herein, may be executed.

The method 700 can further include sending authentication data from the mobile wallet to the smart card while the smart card is in communication with the POS device. For example, the mobile wallet can send GPS data to the smart card which can send the data to the POS device for submission to a processing network to authorize a transaction. In other example, the mobile wallet can program the smart card to require a fingerprint or a mobile device identifier as authentication for a transaction. In this case, while the smart card is coupled to a card reader, the mobile wallet can send the fingerprint data or identifier as authentication to the card for enabling a transaction. In an example, the data is not submitted to the POS device unless the user is authenticated, but the fingerprint data and identifier remain resident on the mobile device. The authentication data can be sent by the smart card to the POS device along with time and location data of the smart card and/or the mobile device, in some examples. Presenting a unique device identifier of a mobile device associated with a companion mobile wallet along with the time and location data can indicate that the user of the smart card is the owner of the companion mobile wallet FIG. 8 is a block diagram illustrating a machine in the example form of a computer system 800, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 can further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 can additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method of using a mobile wallet operating on a mobile device and a contactless smart card having a programmable chip, the method comprising:
   establishing a first wireless communication path between the mobile wallet and the smart card;
   determining that the mobile wallet and the smart card are companions, the determining comprising:
      sending identification data from the mobile wallet to the smart card over the first wireless communication path; and
      determining that the identification data matches a unique device identification for the mobile wallet stored at the smart card;
   sending supplemental data from the mobile wallet to the companion smart card over the first wireless communication path, the smart card comprising a memory having a non-resident data portion that is accessible to the mobile wallet and a resident data portion that is inaccessible to the mobile wallet, the supplemental data comprising location data indicating a location of the mobile device;
   storing the supplemental data at the non-resident data portion of the memory;
   establishing communication between the smart card and a POS device over a second wireless communication path different than the first wireless communication path, wherein the sending of the supplemental data from the mobile wallet to the companion smart card occurs while the smart card and the POS device are in communication over the second wireless communication path; and
   sending the supplemental data and transaction request data, the transaction request data describing a transaction to the POS device; the transaction request data comprising unique account information describing a mobile wallet element for the transaction.

2. The method of claim 1, wherein the supplemental data includes time data for the mobile wallet and sending the supplemental data to the POS device includes sending the time data for the mobile wallet to the POS device.

3. The method of claim 2, further comprising:
receiving a request for time and location data from a processing network; and
wherein sending the time and location data to the POS device occurs in response to the request.

4. The method of claim 1, wherein the supplemental data includes coupon data from the mobile wallet and sending the supplemental data to the POS device includes sending the coupon data for the mobile wallet to the POS device.

5. The method of claim 1, further comprising enabling or disabling the smart card using the mobile wallet.

6. The method of claim 5, further comprising sending a time period of usage from the mobile wallet to the smart card and wherein disabling the smart card upon expiration of the time period.

7. The method of claim 1, further comprising sending authentication data from the mobile wallet to the smart card while the smart card is in communication with the POS device.

8. A non-transitory computer-readable storage medium, the computer-readable storage medium comprising instructions that when executed by a computer, cause the computer to perform operations comprising:
establishing a first wireless communication path between a mobile wallet and a smart card;
determining that the mobile wallet and the smart card are companions the determining comprising:
sending identification data from the mobile wallet to the smart card over the first wireless communication path; and
determining that the identification data matches a unique device identification for the mobile wallet stored at the smart card;
sending supplemental data from the mobile wallet to the companion smart card over the first wireless communication path, the smart card comprising a memory having a non-resident data portion that is accessible to the mobile wallet and a resident data portion that is inaccessible to the mobile wallet, wherein the smart card stores the supplemental data at the non-resident data portion of the memory, wherein the supplemental data comprises location data indicating a location of a mobile device executing the mobile wallet;
establishing communication between the smart card and a POS device over a second wireless communication path different than the first wireless communication path, wherein the sending of the supplemental data from the mobile wallet to the companion smart card occurs while the smart card and the POS device are in communication over the second wireless communication path; and
sending the supplemental data and transaction request data, the transaction request data describing a transaction to the POS device, the transaction request data comprising unique account information describing a mobile wallet element for the transaction.

9. The medium of claim 8, wherein the supplemental data includes time data for the mobile wallet and sending the supplemental data to the POS device includes sending the time data for the mobile wallet to the POS device.

10. The medium of claim 9, further comprising:
receiving a request for time and location data from a processing network; and
wherein sending the time and location data to the POS device occurs in response to the request.

11. The medium of claim 8, wherein the supplemental data includes coupon data from the mobile wallet and sending the supplemental data to the POS device includes sending the coupon data for the mobile wallet to the POS device.

12. The medium of claim 8, further comprising enabling or disabling the smart card using the mobile wallet.

13. The medium of claim 12, further comprising sending a time period of usage from the mobile wallet to the smart card and wherein disabling the smart card upon expiration of the time period.

14. The medium of claim 8, further comprising sending authentication data from the mobile wallet to the smart card while the smart card is in communication with the POS device.

15. A system comprising:
at least one processor; and
at least one memory storing instructions that, when executed by the at east one processor, configure the at least one processor to perform operations comprising:
establishing a first wireless communication path between a mobile wallet and a smart card;
determining that the mobile wallet and the smart card are companions, the determining comprising:
sending identification data from the mobile wallet to the smart card over the first wireless communication path; and
determining that the identification data matches a unique device identification for the mobile wallet stored at the smart card;
sending supplemental data from the mobile wallet to the companion smart card over the first wireless communication path, the smart card comprising a memory having a non-resident data portion that is accessible to the mobile wallet and a resident data portion that is inaccessible to the mobile wallet, the supplemental data comprising location data indicating a location of the mobile device;
storing the supplemental data at the non-resident data portion of the memory;
establishing communication between the smart card and a POS device over a second wireless communication path different than the first wireless communication path, wherein the sending of the supplemental data from the mobile wallet to the companion smart card occurs while the smart card and the POS device are in communication over the second wireless communication path; and
sending the supplemental data and transaction request data, the transaction request data describing a transaction to the POS device, the transaction request data comprising unique account information describing a mobile wallet element for the transaction.

16. The system of claim 15, wherein the supplemental data includes time data for the mobile wallet and sending the supplemental data to the POS device includes sending the time data for the mobile wallet to the POS device.

17. The system of claim 15, wherein the supplemental data includes coupon data from the mobile wallet and sending the supplemental data to the POS device includes sending the coupon data for the mobile wallet to the POS device.

18. The system of claim 15, the operations further comprising enabling or disabling the smart card using the mobile wallet.

19. The system of claim 15, wherein the instructions configure the at least one processor to send a time period of usage from the mobile wallet to the smart card and disable the smart card upon expiration of the time period.

20. The system of claim 15, wherein the instructions configure the at least one processor to send authentication data from the mobile wallet to the smart card while the smart card is in communication with the POS device.

* * * * *